US005345758A

United States Patent [19]

Bussing

[11] Patent Number: 5,345,758
[45] Date of Patent: Sep. 13, 1994

[54] ROTARY VALVE MULTIPLE COMBUSTOR PULSE DETONATION ENGINE

[75] Inventor: Thomas R. Bussing, Issaquah, Wash.

[73] Assignee: Adroit Systems, Inc., Alexandria, Va.

[21] Appl. No.: 45,771

[22] Filed: Apr. 14, 1993

[51] Int. Cl.⁵ .................................................. F02C 5/02
[52] U.S. Cl. ........................... 60/39.38; 60/39.39; 60/39.76; 60/39.78; 60/39.827
[58] Field of Search .................... 431/1, 158, 278, 280, 431/281; 60/39.38, 39.39, 39.76, 39.78, 39.821, 39.826, 39.827

[56] References Cited

U.S. PATENT DOCUMENTS

| | | | |
|---|---|---|---|
| 1,395,995 | 11/1921 | George | 60/39.39 |
| 1,552,272 | 9/1925 | Carner | 60/39.39 |
| 2,515,644 | 7/1950 | Goddard | 60/39.77 |
| 2,557,198 | 6/1951 | Nichols | 60/39.39 |
| 2,563,022 | 8/1951 | Goddard | 60/39.76 |
| 2,640,314 | 6/1953 | Abel | 60/39.76 |
| 2,659,198 | 11/1953 | Cook | 60/39.39 |
| 2,923,124 | 2/1960 | Mendez-Llamozas | 60/39.78 |
| 2,928,242 | 3/1960 | Guenther | 60/39.39 |
| 2,930,196 | 3/1960 | Hertzberg et al. | 60/39.76 |
| 2,942,412 | 6/1960 | Bollay | 60/39.77 |
| 3,008,292 | 11/1961 | Logan, Jr. | 60/39.76 |
| 3,494,127 | 2/1970 | Brille | 60/39.39 |
| 3,877,219 | 4/1975 | Hagen | 60/39.39 |
| 3,954,380 | 5/1976 | Valaev et al. | 431/1 |
| 4,538,410 | 9/1985 | Klaebo | 60/39.02 |
| 4,741,154 | 5/1988 | Eidelman | 60/39.34 |

FOREIGN PATENT DOCUMENTS 1014794 8/1957 Fed. Rep. of Germany ..... 60/39.39
1274411 8/1968 Fed. Rep. of Germany ..... 60/39.78

OTHER PUBLICATIONS

Cambier et al. Preliminary Numerical Simulations of a Pulsed Detonation Wave Engine, AIAA Paper 88-2960, Jul. 1988.
Carlstrom et al., GE Seminar, Athens Greece, Jun. 1978, pp. 1-18.
Eidelman et al. Pulsed Detonation Engine Experimental and Theoretical Review, AIAA Paper 92-3168, Jul. 1992.
Eidelman et al. Air-Breathing Pulsed Detonation Concept; A Numerical Study, AIAA Paper 90-2420, Jul. 1990.
Helman et al. Detonation Pulse Engine, AIAA Paper 86-1683, Jun. 1986.
Wortman et al. Detonation Duct Gas Generator Demonstration Program, AIAA Paper 92-3174, Jul. 1992.

*Primary Examiner*—Richard A. Bertsch
*Assistant Examiner*—Howard R. Richman
*Attorney, Agent, or Firm*—Collier, Shannon, Rill & Scott

[57] ABSTRACT

A pulse detonation engine is provided with several detonation combustors selectively coupled to an air inlet and fuel source by a rotary valve. The rotary valve isolates the steady operation of the air inlet and fuel system from the unsteady nature of the detonation process, and allows the fueling of some of the detonation chambers while detonation occurs in other detonation chambers. The fuel system may use a solid fueled gas generator.

24 Claims, 11 Drawing Sheets

ROTARY VALVE MULTIPLE COMBUSTOR PULSE DETONATION ENGINE

BACKGROUND OF THE INVENTION

1. Technical Field

The present invention relates to intermittent combustion engines in which the combustion products are used as a motive fluid.

2. Background Information

Intermittent combustion engines in the form of pulse jet engines, such as those in U.S. Pat. No. 2,930,196 to Hertzberg et al. and U.S. Pat. No. 3,008,292 to Logan, are known. Pulse combustion in these prior art engines is deflagrative in nature.

A deflagration combustion process results in propagation velocities on the order of a few feet per second. A detonation process, by contrast, can result in propagation velocities on the order of several thousands of feet per second.

The use of a detonation combustion process in an engine has been suggested. For example, U.S. Pat. No. 4,741,154 to Eidelman shows a rotary engine using a detonation process.

SUMMARY OF THE INVENTION

An object of the present invention is to provide a pulse detonation engine with design and operational simplicity.

Another object of the present invention is to provide a pulse detonation propulsion system with significant performance advantages in the subsonic and supersonic flight regimes.

Another object of the present invention is to provide a pulse detonation propulsion system that can operate at higher cycle frequencies and lower inlet losses than previous intermittent combustion engines.

Another object of the present invention is to provide a pulse detonation propulsion system with the advantage of storability.

The present invention achieves the above objectives by providing a pulse detonation engine with several detonation combustors selectively coupled to an air inlet and fuel source by a rotary valve. The rotary valve isolates the steady operation of the air inlet and fuel system from the unsteady nature of the detonation process, and allows the fueling of some of the detonation chambers while detonation occurs in other detonation chambers. The fuel system may use liquid, gaseous, or solid fuel.

DESCRIPTION OF THE PREFERRED EMBODIMENTS

Figure 1A:
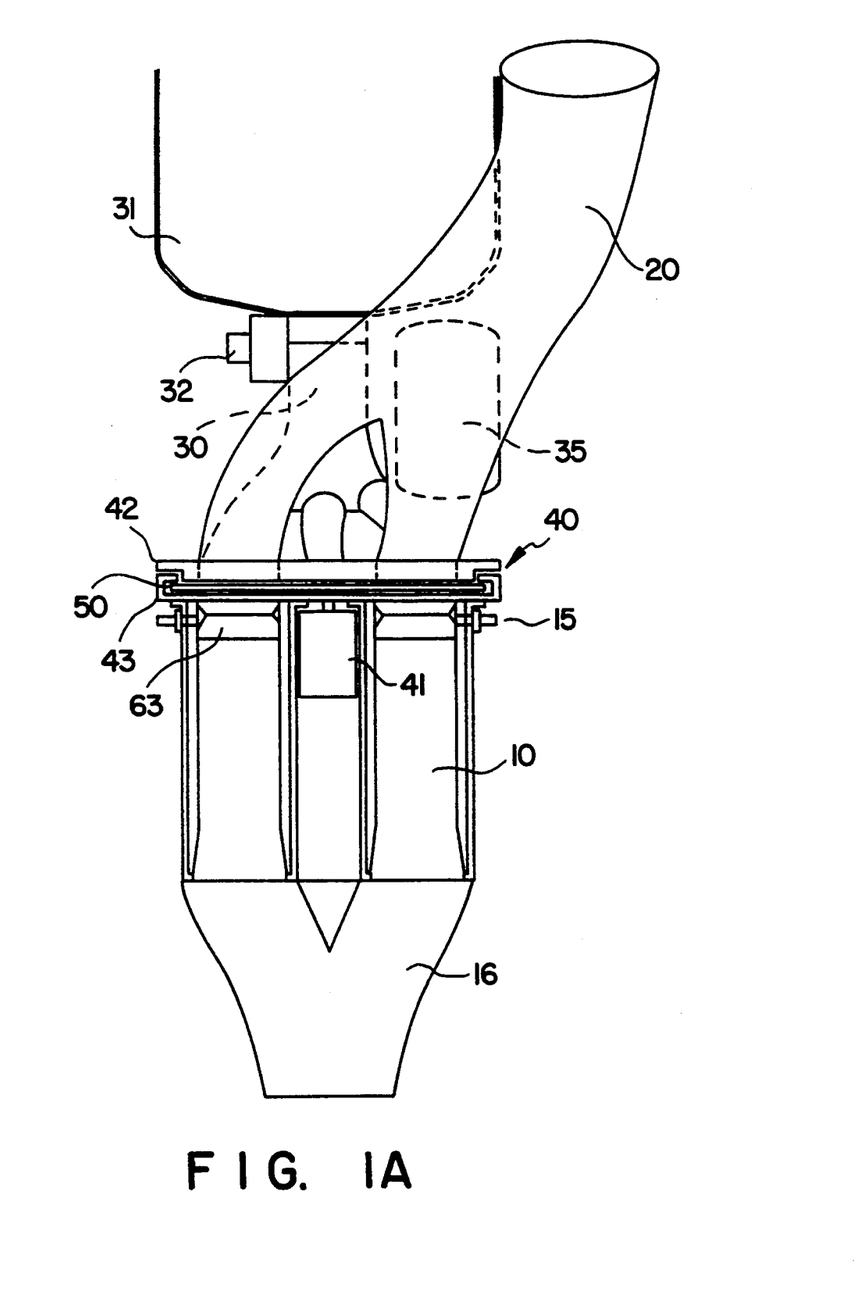
FIG. 1A shows a cross-sectional view of one embodiment of the pulse detonation engine of the present invention.

FIG. 1A shows a cross-sectional view of one embodiment of the pulse detonation engine of the present invention. The engine has two or more combustors or detonation chambers 10, each of which has an elongated, tubular construction. The lengths of the combustors 10 extend parallel to each other, so that they each produce thrust in the same direction. A nozzle shroud 16 may be used at the outlet end of the combustors 10 to create a quasi-uniform exit flow.

The combustors 10 are fueled with air from an inlet air duct manifold 20 and fuel from a fuel manifold 30. The inlet for the air duct manifold 20 may be in the form of a simple normal shock inlet. The fuel manifold 30 delivers fuel from a fuel source 31 which can be controlled by a valve 32.

Figure 1B:
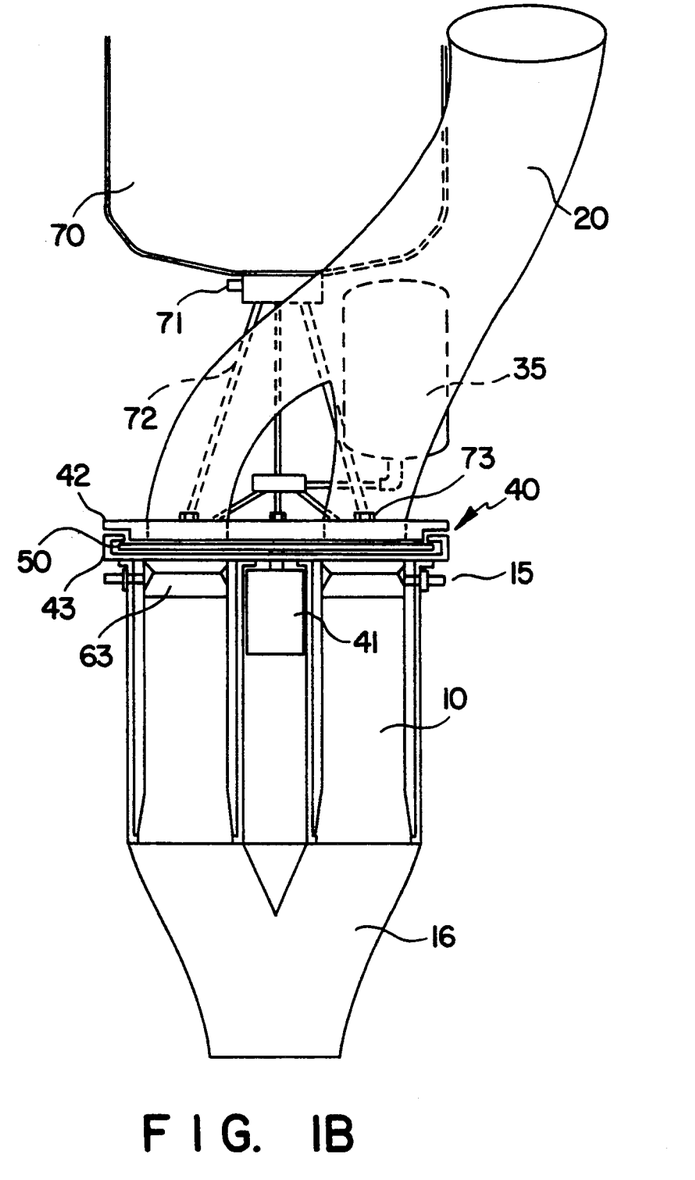
FIG. 1B shows a cross-sectional view of an alternative embodiment of the pulse detonation engine of the present invention.

The pulse detonation engine of the present invention may use solid, liquid or gas fuel. For example, the fuel source may be a solid fuel gas generator which can be controlled by a gas generator control valve. As shown in FIG. 1B, the fuel source may be a liquid fuel source 70 which distributes fuel to the combustors through a series of liquid fuel lines 72 and fuel injectors 73 and which is controlled by a liquid fuel control valve 71. One or more fuel injectors 73 may be used for each combustor. Depending on the choice of fuel, an oxidizer generator 35 may be used.

The combustors 10 are coupled to the inlet air duct manifold 20 and the fuel manifold 30 by a manifold/rotor assembly 40. The manifold/rotor assembly 40 has a rotor disk valve 50 positioned between a fuel/air manifold mounting plate 42 on the upper side of the manifold/rotor assembly 40 and a combustor mounting plate 43 on the lower side of the manifold/rotor assembly 40. The upper mounting plate 42 is coupled to the air manifold 20 and the fuel manifold 30, while the lower mounting plate 43 is coupled to the combustors 10.

The rotor disk valve 50 is positioned for rotation between the upper fuel/air manifold mounting plate 42 and the lower combustor mounting plate 43. The rotor disk valve 50 has openings 51 (see FIG. 5) and is rotated by a rotor drive motor 41, so that it may alternately open and close the passage between the fuel and air manifolds and the combustors.

An ignitor 15, which may be, for example, a spark plug, is arranged near the inlet end of each combustor 10. An impingement ring 63 may also be positioned near the inlet end of each combustor 10 to assist in mixing the fuel and air in preparation for detonation.

Figure 2:
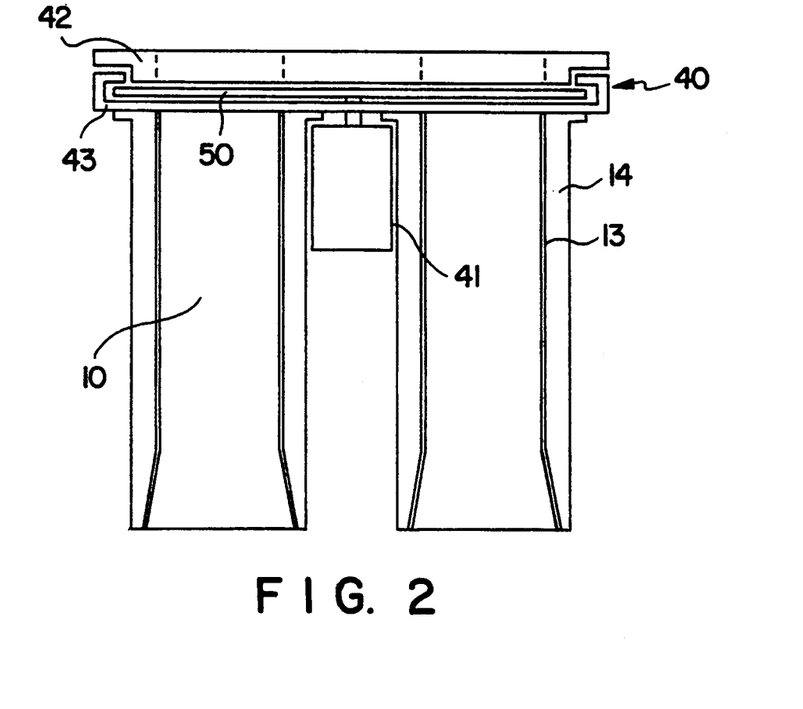
FIG. 2 shows a cross-sectional view of the pulse detonation combustors and the manifold/rotor assembly of the pulse detonation engine of FIG. 1.

FIG. 2 shows a cross-sectional view of the pulse detonation combustors 10 and the manifold/rotor assembly 40 of the pulse detonation engine of FIG. 1. Each combustor 10 is in the form of an elongated cylindrical tube, with one end (the inlet end) attached to the manifold/rotor assembly. The combustors 10 are arranged concentrically about an axis of the cluster, with the lengths of the cylindrical tubes extending parallel to each other. The illustrated embodiment shows four combustors (see FIG. 4); however, the engine is not limited to this number. It will be appreciated that the combustor chambers can also have a non-circular cross-section. For example, the cross-section could be square or pie-shaped.

The combustors 10 may be constructed of a carbon/carbon matrix 14. As shown in FIG. 2, the combustors 10 may have an inner coating 13 which may be, for example, ruthenium, arranged within the carbon/carbon matrix 14.

Figure 3:
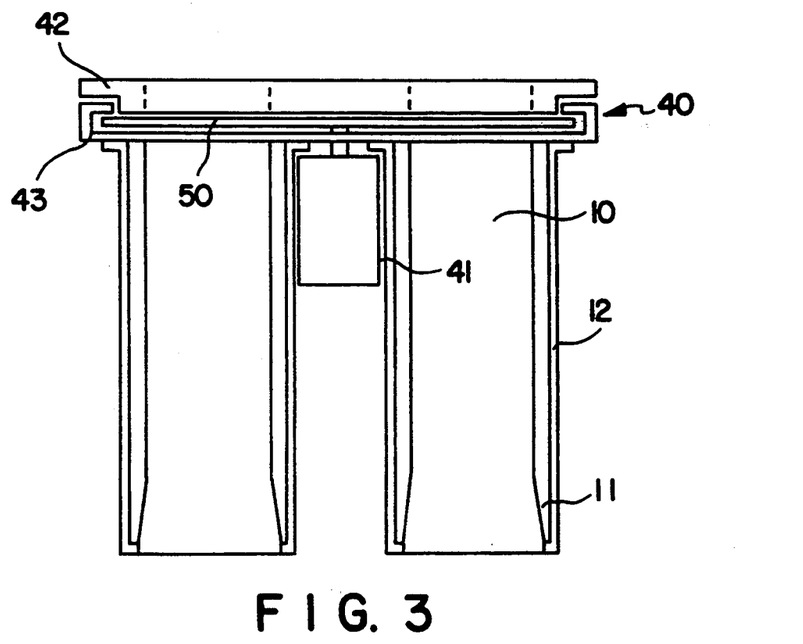
FIG. 3 shows a cross-sectional view of another embodiment of the pulse detonation combustors of the present invention.

Other constructions of the combustors 10 are within the scope of the present invention. For example, as shown in FIG. 3, each combustor 10 may have a ceramic liner 11 which may be, for example, $Si_3N_4$ or $ZrO_2$. The liner is arranged within a ceramic matrix composite wrap 12. Alternatively, the combustors may be constructed of a suitable high temperature metal alloy, for example an alloy of titanium/zirconium/molybdenum.

Figure 4:
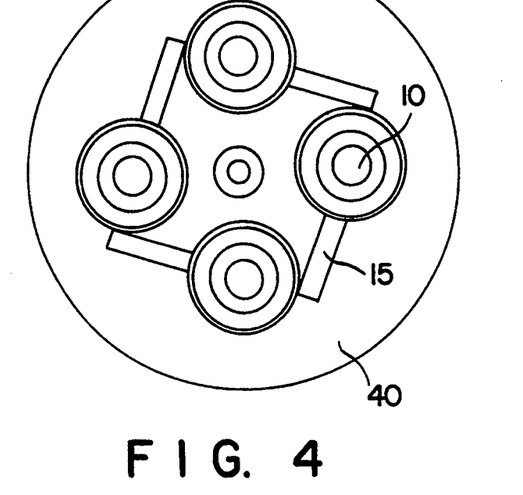
FIG. 4 shows a bottom view of the pulse detonation combustors of FIG. 2.

FIG. 4 shows a bottom view of the pulse detonation combustors of FIG. 2, showing the arrangement of the combustors about a common axis of the combustor cluster. A separate ignitor 15, which may be, for example, a spark plug, is arranged near the inlet end of each combustor 10.

As an alternative to the spark plug 15 arranged near the inlet end of each combustor 10, a separate predetonation tube may be used to initiate detonation. In an embodiment using this method, the separate predetonation tube may be constructed as a small tube above the manifold/rotor assembly 40. The predetonation tube is fueled with fuel and an oxidizer, and detonation is initiated therein by a suitable ignitor. The predetonation tube is constructed to fire into the main combustor 10 after the main combustor 10 has been completely fueled.

As will be explained later with reference to FIG. 11, detonation may also be initiated by using a predetonation zone in the primary combustors 10. This collocated predetonation method can be achieved by injecting a region of fuel mixed with an oxidizer.

Figure 5:
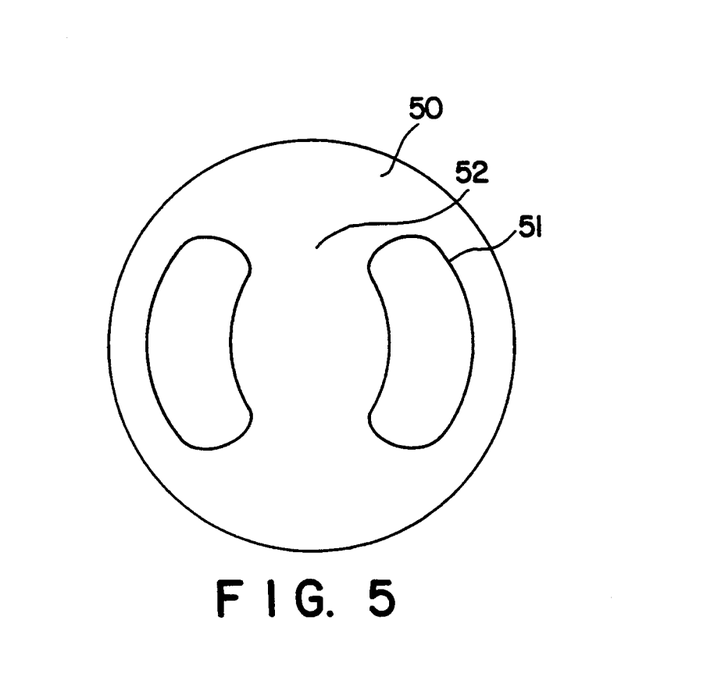
FIG. 5 shows a top view of the rotor disk valve of the pulse detonation engine of FIG. 1.
Figure 6:
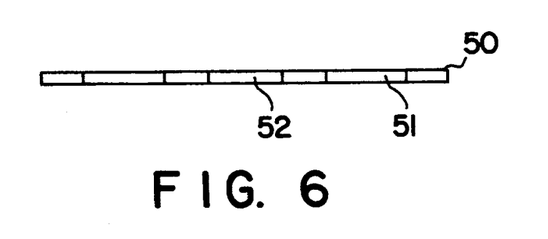
FIG. 6 shows a side view of the rotor disk valve of FIG. 5.

The rotor disk valve 50 as shown in FIGS. 5 and 6 has two fueling port openings 51; however, the rotor disk valve is not limited to this number. The openings 51 are arranged circumferentially around the center of the rotor disk valve 50, so that as the disk valve 50 rotates, the openings 51 are selectively positioned above the inlet ends of the combustors 10 for fueling. The distance of the openings 51 from the center of the rotor disk valve 50 corresponds to the distance of the inlets of the combustors 10 from the central axis of the combustor cluster.

In the illustrated embodiment, the openings 51 are arcuate in shape, defined by inner and outer concentric edges. The distance between the inner and outer edges (i.e. the width) of the openings 51 is selected for cooperation with the combustor inlets.

Solid portions 52 are arranged between the openings 51 of the rotor disk valve 50. As the rotor disk valve 50 rotates, the openings 51 and solid portions 52 are alternately positioned above the inlet ends of the combustors 10. Thus, fueling of a combustor 10 occurs when an opening 51 is positioned over the inlet end, and a combustor may be fired when a solid portion 52 is positioned over the inlet end.

Figure 7:
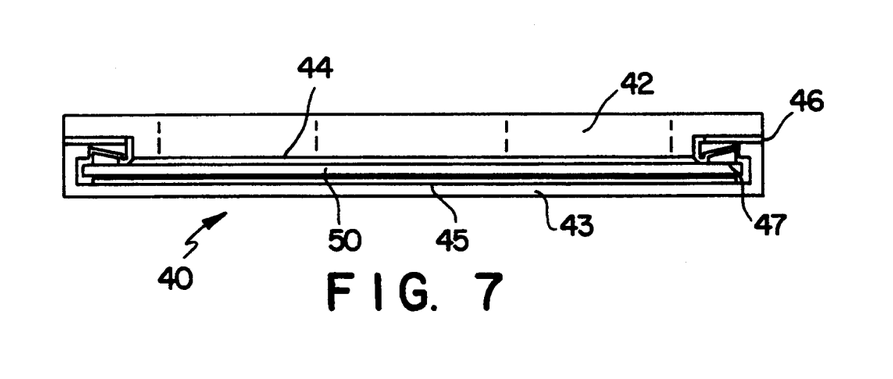
FIG. 7 shows a cross-sectional view of the manifold/rotor assembly of the pulse detonation engine of FIG. 1.
Figure 8:
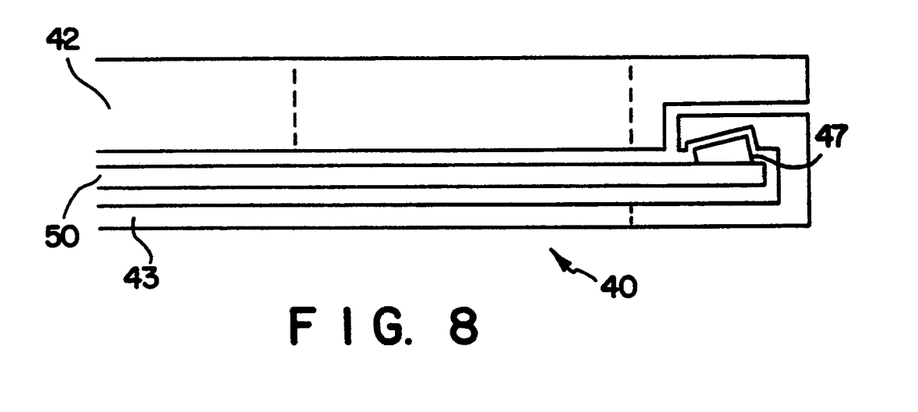
FIG. 8 shows an enlarged cross-sectional view of the manifold/rotor assembly of FIG. 7.

FIGS. 7 and 8 show cross-sectional views of the manifold/rotor assembly 40 of the engine of FIG. 1. The fuel/air manifold mounting plate 42 is located on the upper side of the manifold/rotor assembly 40 for coupling to the air manifold 20 and the fuel manifold 30. The lower combustor mounting plate 43 is positioned for coupling to the combustors 10. The rotor disk valve 50 is arranged between the upper fuel/air manifold mounting plate 42 and the lower combustor mounting plate 43. Each of the fuel/air manifold mounting plate 42, the lower mounting plate 43 and the rotor disk valve 50 may be constructed, for example, of titanium/zirconium/molybdenum or carbon/carbon.

Sealing elements 44, 45 and 46 are arranged between the parts of the manifold/rotor assembly 40. These sealing elements are arranged to prevent leakage of gases. They may be constructed, for example, of solid graphite or carbon/carbon impregnated with graphite.

A series of tapered roller bearings 47 are positioned on the side of the rotor disk valve 50 away from the combustors 10. Forces from the detonation processes within the combustors 10 on the rotor disk valve 50 are transferred via the bearings 47 to the manifold/rotor assembly 40. Thus, the bearings 47 allow transfer of pressure forces from the rotor disk valve 50 to the vehicle body during operation of the engine. Other bearing arrangements are possible within the scope of the present invention.

Figure 9:
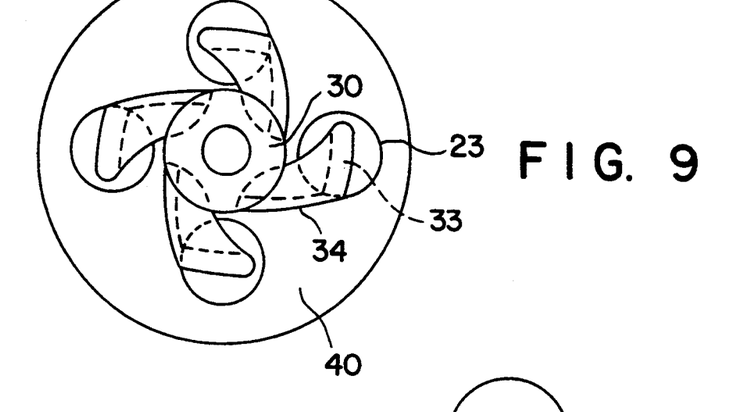
FIG. 9 shows a top view of the fuel manifold of the pulse detonation engine of FIG. 1A.
Figure 10A:
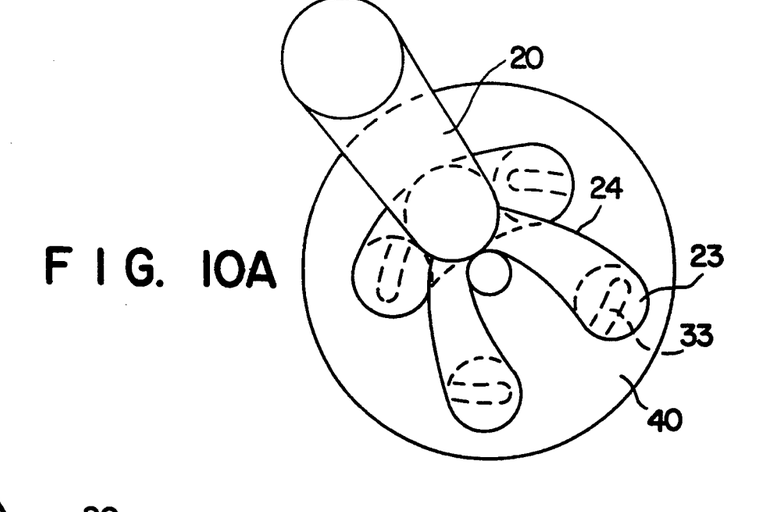
FIG. 10A shows a top view of the air manifold of the pulse detonation engine of FIG. 1A.

FIGS. 9 and 10 show top views of the fuel manifold 30 and inlet air duct manifold 20, respectively. Fuel is distributed from the gas fuel generator to each combustor 10 through individual fuel ducts 34. Each individual fuel duct 34 has a finger-shaped cross-section and ends at a finger-shaped port 33 which opens into the corresponding combustor 10.

The individual fuel ducts 34 are arranged partially within individual air ducts 24, which are shown in FIG. 10A. The individual air ducts 24 distribute air from the inlet air duct manifold 20 to the combustors 10. Each individual air duct 24 ends in a circular air port 23 which opens into the corresponding combustor 10. The finger-shaped fuel ports 33 (shown in phantom lines in FIG. 10) are arranged within the air ports 23. It will be appreciated that this arrangement allows each combustor to be "topped off" with air after it is fueled.

Figure 10B:
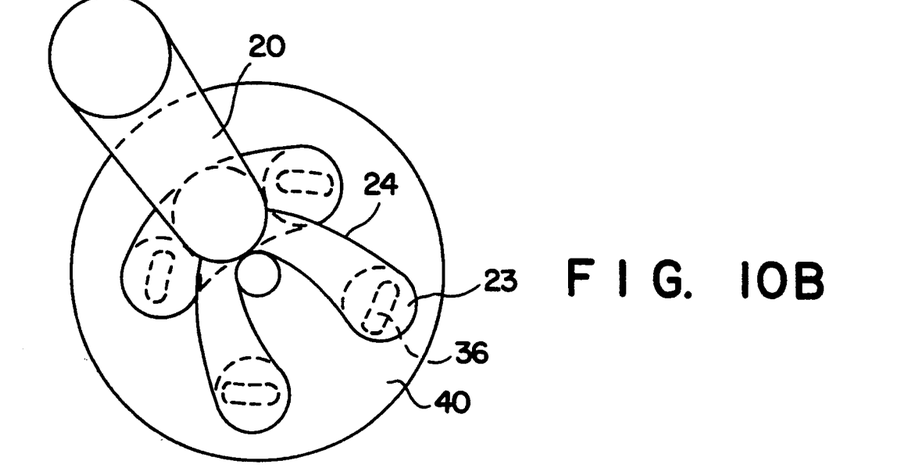
FIG. 10B shows a top view of an alternative embodiment of a fueling arrangement.

The finger-shaped fuel ports 33 shown in FIGS. 9 and 10A may also be constructed so that they do not extend completely to either side of the air ports 23, as shown by the fuel ports 36 in FIG. 10B. Each fuel port 36 may be constructed to have an elliptical cross-section centrally located and completely within the respective air port 23. It will be appreciated that when the fuel port 36 is displaced from the leading edge of the air port 23 the combustors 10 may be flushed with air prior to fueling.

Having described the various components, the operation of the pulse detonation engine of FIG. 1 is as follows. Fuel is distributed from the fuel source in a steady mode, and air enters the inlet air duct manifold also in a steady mode. Rotor drive motor 41 rotates the rotor disk valve 50 between the fuel/air manifold mounting plate 42 and the lower mounting plate 43.

It will be appreciated by one skilled in the art that when liquid fuel is used, as illustrated in FIG. 1B, the fueling of the combustors will occur through liquid fuel lines 72 and fuel injectors 73. The operation of the rotor disk valve 50 will serve to selectively fuel the combustors in essentially the same way as in a gas or solid fueled engine, as described below.

In the fueling arrangement illustrated in FIGS. 9 and 10 corresponding to the engine shown in FIG. 1A, as an opening 51 of the rotary valve 50 moves into position over the inlet end of a combustor 10, air and fuel enter that combustor through the corresponding port 23, 33. As the rotor disk valve 50 continues to rotate, the trailing edge of the opening 51 closes off the finger-shaped fuel port 33, while air continues to enter the combustor 10 through a portion of the circular port 23 which remains open. Thus, the fuel-air mixture in the combustor is "topped off" with air, and any gaps that may exist in the system are filled with air. The air acts as an additional insulation buffer to protect the rotor assembly and prevent pre-ignition of neighboring combustors.

Figure 11:
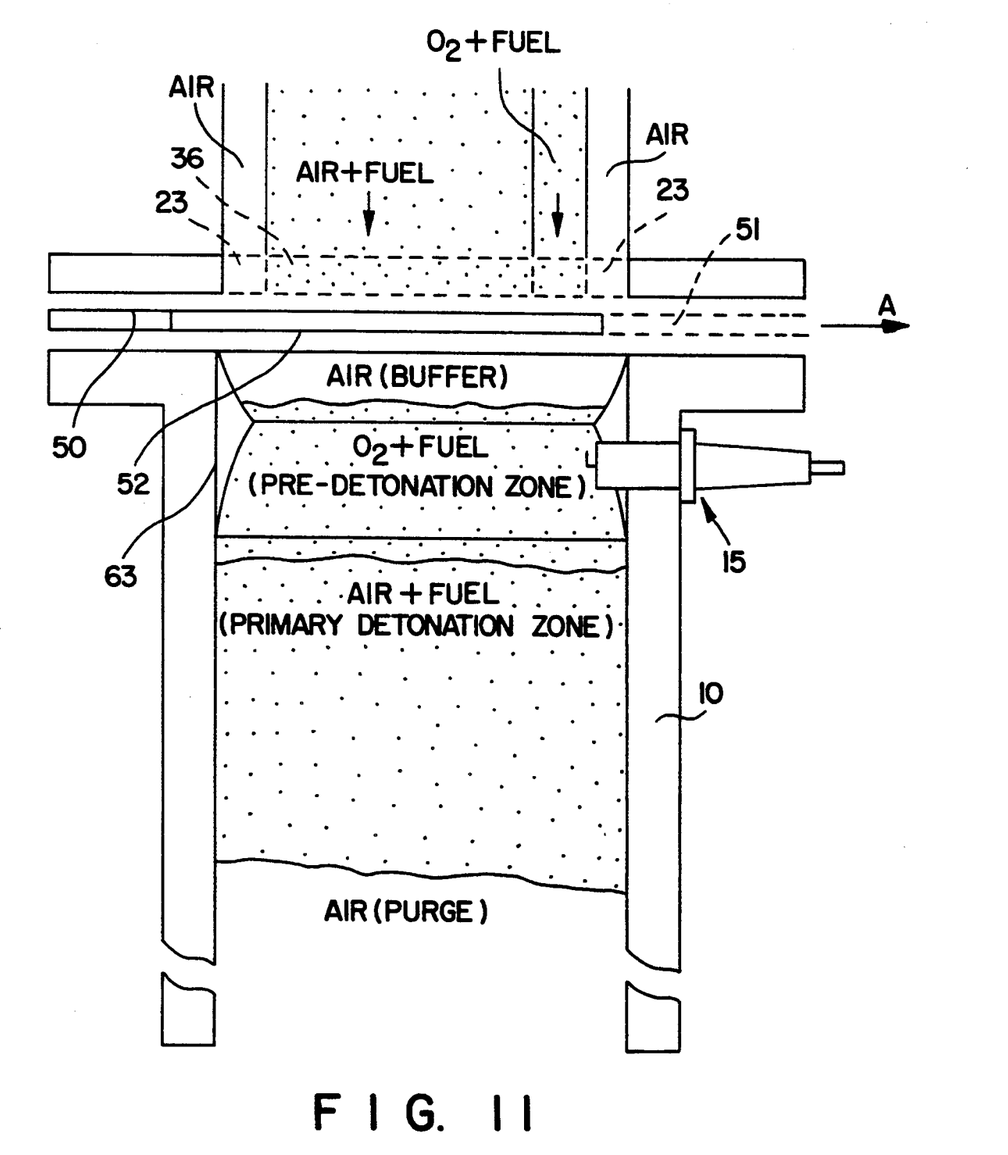
FIG. 11 shows a cross-sectional view of a combustor tube during fueling.

In the embodiment illustrated in FIG. 11, the fuel port 36 is constructed so that it is displaced from the edge of the air port 23 at either end. With this construction, the combustor 10 may be purged with air before fueling and topped off with air after fueling.

The combustor 10 in FIG. 11 is shown just prior to closing of the rotor valve 50. The rotor valve 50 rotates in a direction shown by the arrow A. In FIG. 11, an opening 51 has almost completely passed over the inlet end of the combustor 10.

The zones illustrated in the combustor 10 in FIG. 11 depict the areas that result from the fueling arrangement. When the leading edge of the opening 51 of the rotor valve 50 first opened the inlet of the combustor 10, air (from the leftmost region shown at the top of FIG. 11) entered the tube to flush the combustor of any remaining burnt gases from the previous cycle. This air is shown as the purge region at the bottom of FIG. 11.

As the rotor valve 50 continued to rotate, the opening 51 was positioned below the air and fuel ducts, thereby creating the primary detonation zone illustrated in the center of combustor 10. Continued rotation of the rotor valve 50 opened an oxidizer duct connected to the oxidizer generator 35. In the illustrated embodiment oxygen is used as the oxidizer, but other suitable oxidizers may be used. The introduction of oxidizer created the pre-detonation zone illustrated adjacent the spark plug 15 in FIG. 11.

As the rotor valve 50 neared closing and reached the position shown in FIG. 11, the opening 51 allowed only air (from the rightmost region shown at the top of FIG. 11) to enter the combustor 10. This created the buffer region illustrated at the top of the combustor 10, thereby topping off the fueled combustor with air.

With continued rotation of the rotor disk valve 50 past the position shown in FIG. 11, a solid portion 52 between openings 51 is positioned to close off the inlet end of the fueled combustor 10. In the illustrated embodiment, the ignitor 15 corresponding to the fueled combustor 10 is then fired in the predetonation zone to initiate detonation. Other methods of initiating detonation, for example an arc jet, may be used.

Upon detonation, pressure forces will act upon all inner surfaces of the combustors 10. The pressure differential from the inlet end to the outlet end of each combustor 10, acting upon the rotor valve 50, will contribute to the thrust of the vehicle. The combustors 10 may be tapered so that pressure along the lateral inner surfaces of the combustors will contribute to thrust. The transfer of the pressure forces from the rotor plate 50 to the vehicle structure occurs through the bearing load transfer system 47. Thrust may be controlled by varying the spark ignitor timing, valve rotation rate and fuel injection rate, for example, through a microprocessor controller.

It will be appreciated that while one set of combustors is being fired, another set of combustors is being fueled with fresh fuel-air mixtures. As the rotor disk valve 50 seals a set of opposing chambers for detonation, it also opens the adjacent chambers for recharging.

The detonation cycle of the pulse detonation combustors 10 of the present invention can be described according to the fundamental processes that occur within the combustors. The pulse detonation combustor cycle is comprised of several distinct events or processes:

A. The detonation chamber is charged with fuel-air mixture;
B. The rotary valve seals the fueled chamber, and detonation is initiated at the closed end;
C. A detonation wave travels through the closed chamber;
D. The detonation wave exits, and burned gases are exhausted; and
E. The rotary valve opens the chamber, and the chamber is recharged (while adjacent detonation chambers are fired).

The processes occurring within a single chamber 10 will be explained with reference to FIGS. 12 through 19, which show successive steps in the combustion process of the pulse detonation engine of FIG. 1.

Figure 12:
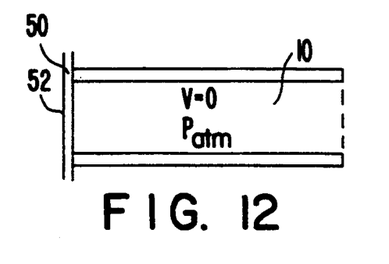
FIG. 12 shows a schematic representation of conditions within a combustor before fueling.

Initially, as shown in FIG. 12, the detonation chamber 10 contains gas at atmospheric pressure. A solid portion 52 of the rotary valve 50 seals the inlet end of the detonation chamber 10. At the start of the very first cycle, the chamber contains air at atmospheric conditions. In later cycles, at the start of the cycle, the chamber will contain a combination of air and unexhausted detonation products. In those later cycles, the chamber will be at atmospheric pressure, but the temperature can be somewhat greater than atmospheric due to the presence of burned gas (unless complete aspiration has occurred).

Figure 13:
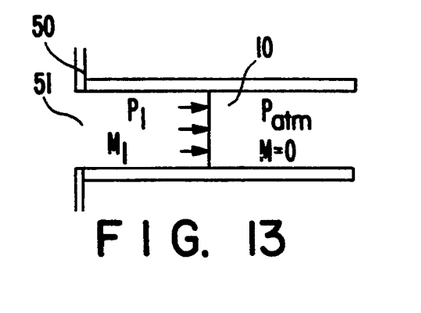
FIG. 13 shows a schematic representation of conditions within a combustor during fueling.

As shown in FIG. 13, the rotary valve 50 will be rotated to position an opening 51 over the inlet. As the valve is opened, a fuel-air mixture is introduced into the chamber 10. As described above, the chamber may be flushed with air prior to fueling. The velocity of the fuel-air mixture introduced into the combustor 10 can be adjusted in accordance with a combustor flow Mach number which will maximize engine performance. The pressure and temperature of the fuel-air mixture entering the combustor 10 is at P1 and T1, corresponding to State One.

Figure 14:
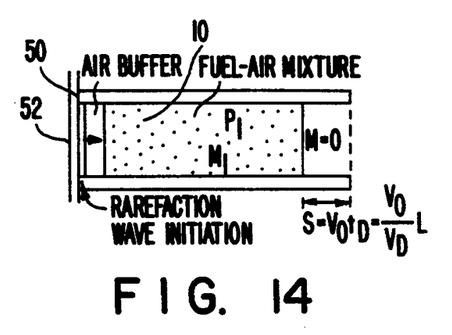
FIG. 14 shows a schematic representation of conditions within a combustor after fueling is complete.

As the valve 50 rotates toward sealing the combustor 10, it is designed to inject a narrow air buffer at the top or closed end of the combustion chamber, as shown in FIG. 14. The air buffer prevents strong shocks from propagating within the rotor valve assembly and causing neighboring detonation tube pre-ignition. The buffer also serves to insulate the rotor from the high temperature detonation products.

As shown in FIG. 14, once the combustor 10 is fueled and "topped off" by an air buffer, the rotor disk valve 50 rotates to seal the combustion chamber 10 in preparation for detonation initiation. Solid portion 52 of the valve 50 fully closes the combustor chamber when the downstream fuel-air mixture is still at some finite distance from the open end of the chamber. The valve timing ensures that the fuel-air mixture and the detonation wave reach the combustor exit simultaneously, thus preventing any of the mixture from escaping unused. For a point design, the length of the detonation tube near the exit which is not filled with fuel is calculated from the overall length of the tube and the relative velocities of the fuel-air slug and detonation wave.

Figure 15:
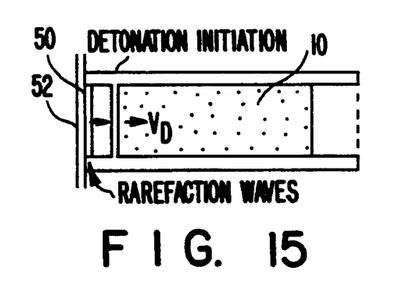
FIG. 15 shows a schematic representation of conditions within a combustor at the initiation of detonation.
Figure 16:
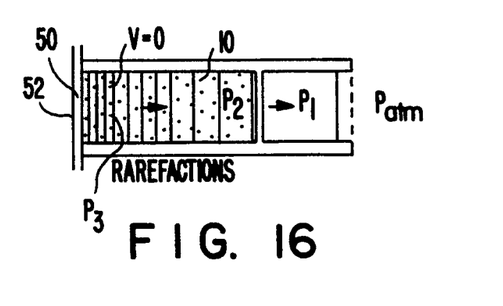
FIG. 16 shows a schematic representation of conditions within a combustor during the propagation of a detonation wave.

FIG. 15 shows a detonation wave initiated immediately after the valve closes, in the fuel-air mixture region near the closed end of the chamber and just beyond the air buffer region. As the detonation is initiated, an expansion zone is created at the closed end. Rarefaction waves illustrated in FIGS. 15 and 16 are generated at the closed end of the detonation chamber and proceed toward the exit. The rarefactions originate at the closed valve according to the constraint that the fluid's velocity is zero at the closed end. The rarefaction wave strength is determined by the amount of energy required to satisfy that constraint and decelerate the burned gas behind the detonation to zero velocity at the closed valve face.

There are two contributions to the momentum of the burned gas: one from the initial transverse momentum of the fuel-air mixture during injection, and another from the momentum imparted to the burned gas as it is accelerated by the detonation. Even though the burned gases move away from the detonation wave at the speed of sound relative to the wave (Chapman-Jouguet conditions), their velocity will be in the direction of the exit with respect to the chamber walls.

The detonation will proceed toward the open end of the chamber at the Chapman-Jouguet detonation velocity (V1) or Mach number (M1) corresponding to the temperature and pressure at State One. The region ahead of the detonation will contain the unburned gas at State One (T1, P1). Just behind the detonation wave, the burned gas will be at significantly higher temperature and pressure (State 2). Near the inlet or closed end of the detonation tube, the burned gas will be at a somewhat lower temperature and pressure (State 3) than the burned gas immediately behind the detonation. This is due to the expansion resulting from the rarefaction waves generated at the closed valve which propagate downstream (toward the exit) behind the detonation wave. The remainder of the burned gas within the expansion region between the detonation wave and the closed end will be at some condition (T and P) between States Two and Three.

Figure 17:
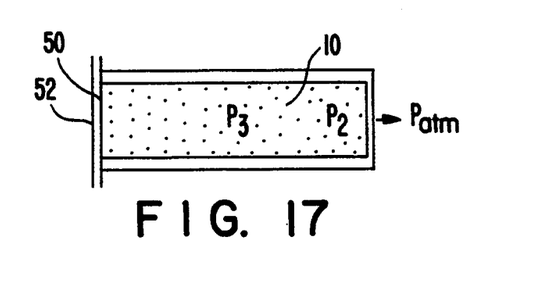
FIG. 17 shows a schematic representation of conditions within a combustor at the exit of a detonation wave.

When the detonation wave reaches the combustion chamber exit and exhausts, the chamber contains burned gas (i.e., combustion products) at elevated temperatures and pressures. Conditions vary along the length of the chamber from State 3 at the closed end to State 2 at the open end as the detonation exits, as shown in FIG. 17. Pressure increases from P3 at the valve to P2 at the open end. The velocity distribution varies accordingly from zero at the valve face, to a high velocity at the exit.

Figure 18:
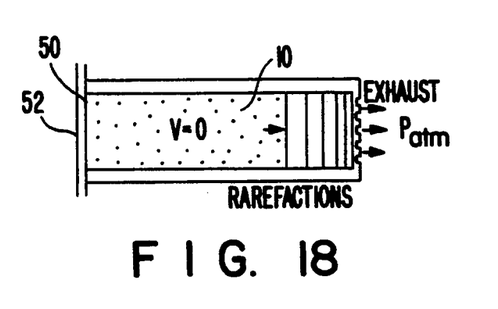
FIG. 18 shows a schematic representation of conditions within a combustor during the propagation of rarefaction waves and the exhaustion of burned gases.

As the detonation exits the tube, a pressure differential of P2-Patm exists at the open end. As illustrated in FIG. 18, this pressure difference creates a series of rarefaction waves which propagate into the tube and expel the burned gas. The rarefaction waves travel into the tube at sonic velocity which varies with temperature. The temperature distribution varies along the length of the detonation chamber and decays with time as the burned gas is expelled.

Figure 19:
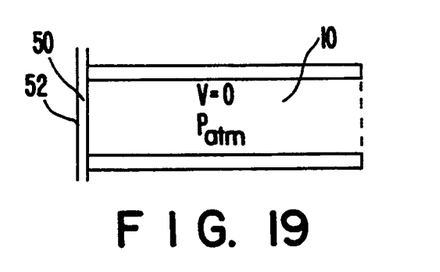
FIG. 19 shows a schematic representation of a combustor before refueling.

As the gas resident in the detonation chamber expands, the transverse pressure differential along the chamber diminishes with time. As shown in FIG. 19, chamber pressures eventually approach atmospheric and the exhaust velocity decays to zero. The chamber temperature can be somewhat greater than atmospheric due to the presence of burned gas (unless complete aspiration has occurred). The detonation cycle can then be repeated.

Figure 20:
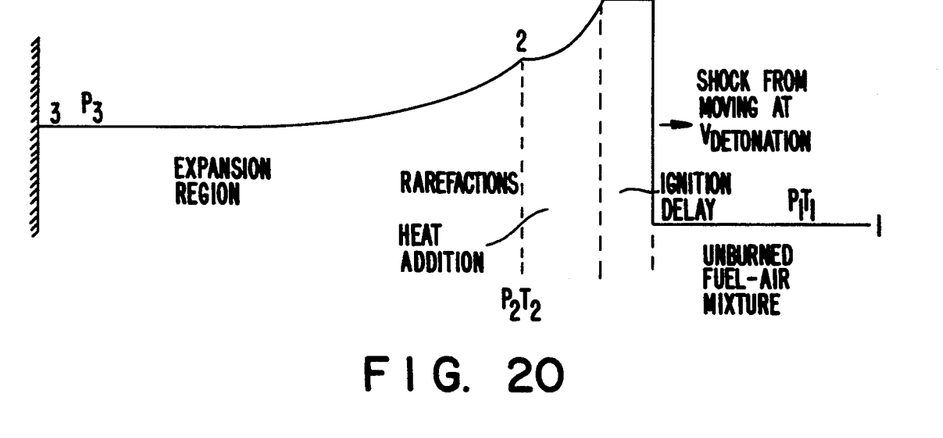
FIG. 20 is a graph showing flow properties within a detonation chamber, corresponding to a combustor at a stage as depicted in FIG. 16.

FIG. 20 shows the physics associated with a detonation wave created within a closed tube. The horizontal axis of FIG. 20 corresponds to the distance along the combustor. FIG. 20 depicts a stage in the detonation cycle corresponding to that shown in FIG. 16.

The detonation wave can be considered to be comprised of a strong shock wave, which triggers combustion, and a thin flame front or heat addition region just behind the shock. The shock front moves at the detonation velocity, V1 relative to the gas, and increases the pressure and temperature of the gas from its previous values of P1 and T1. An ignition delay region whose thickness is dictated by the reaction chemical kinetics exists just behind the shock.

Once the chemical reaction begins, heat is added to the flow and the pressure decreases from the shock front pressure. The thickness of the heat addition region is determined by the total time required to complete the fuel and oxygen reaction. At this point the burned gas is at State Two. In accordance with a detonative process, the temperature, pressure, and density at State Two are significantly greater than at State One.

In closed tube detonations, an expansion region exists behind the heat addition region. The furthest downstream location of rarefaction waves delineates the beginning of the expansion region. Rarefaction waves emanate from, and are most heavily concentrated at, the closed valve where the pressure P3 exists according to the zero transverse velocity boundary condition at the wall.

Figure 21:
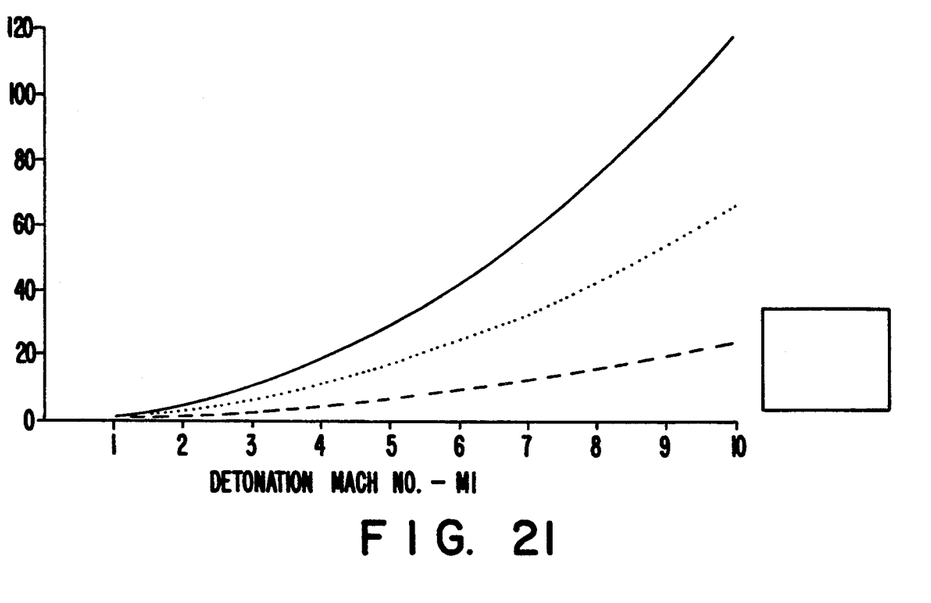
FIG. 21 is a graph showing pressure ratios as a function of detonation wave Mach number.

FIG. 21 shows the expected detonation pressure ratios as a function of detonation wave Mach number. Three pressure ratios associated with a detonation wave propagating in a tube with one closed end are depicted. $P_S$ is the pressure just after the initial shock front and before heat is added to the flow (i.e., in the ignition delay region). $P_2$ is the pressure just after the heat addition region, and is somewhat lower than the shock front pressure. Finally, $P_3$ is the pressure at the closed end of the tube. This value has been decreased substantially from $P_2$ as a result of the rarefaction waves behind the detonation wave.

One factor contributing to the characteristics of the detonation process is the method of fueling and selection of fuel. In addition to the use of solid fuel, described in detail below, liquid or gas fuel may be used in the present invention. Examples of liquid fuels which may be used in the present invention include, but are not limited to, liquid hydrogen and liquid hydrocarbons. A suitable gaseous fuel is, for example, hydrogen gas.

A preferred fueling arrangement of a pulse detonation engine according to the present invention uses a solid fuel gas generator, or pre-combustor, which produces a fuel-rich gas mixture. The gas generator can be designed and operated in at least two different modes. In both cases, a fuel-rich mixture is generated, which, when mixed with air from the primary inlets, is burned in the combustion chamber.

The first mode is based on a fuel mixture that incorporates just enough oxidizer to allow the fuel grain to burn or pyrolize. Control of the fuel flow is possible with a gas generator control valve located at the top of the gas generator.

The second mode, hybrid gas generation, uses air from a secondary inlet system to burn or pyrolize the fuel grain. The secondary air flow stream provides oxygen to promote burning of the fuel solid inside the hybrid gas generator. The burning liberates large quantities of unburned fuel which then forms the fuel-rich secondary flow stream. If the secondary air flow is varied, by bleeding for example, the rate of pre-combustion is reduced and the quantity of fuel-rich gas entering the combustion chamber is lowered. A smaller quantity of fuel in the combustion chamber decreases the stagnation temperature rise and results in a lower vehicle thrust.

The rate at which a fuel mixture is produced in either gas generator is related to the fuel solid regression rate. The regression rate is controlled by the rate at which heat is transferred from a reaction or a free stream zone to the pyrolizing wall. The decomposition mechanism is modeled using turbulent boundary layer theory. It predicts the magnitude and the form of the contributing effects and provides an estimate of the expected regression rates. Regression rates for solid fuels are determined experimentally. The gas generator flow rate is controlled by a gas generator control valve, such as valve 32 shown in FIG. 1.

The choice of fuels with the desired detonation properties is an important aspect of detonation engine development. Example fuels for the present invention include, but are not limited to, aluminum (solid or vapor), magnesium (solid or vapor), carbon and simple hydrocarbons and possibly boron.

Boron has ideal energy content, but boron particles produced by a gas generator are usually coated with an oxide layer which must first be removed before the boron will ignite.

A fuel-rich gas based on aluminum can be generated without an oxide layer. The aluminum particle size should be kept below 10 microns to maintain a sustained detonation. Aluminum can also be generated as a vapor which will further enhance its detonability, Magnesium can be generated as a solid or vapor suspension, and can be detonated. The magnesium particles or droplets must be approximately 10 microns or less to detonate.

Both aluminum and magnesium vapor suspensions have very favorable detonation properties. However, an undesirable property of the vapor suspensions is their tendency to condense on cold surfaces because of the relatively high melting points of the two metals. Condensation of aluminum and magnesium vapor can cause mechanical problems if it occurs on tightly-fitting parts with small gap tolerances. Alternately the system could be heated by designing a gas generator fuel grain which first produces hot gas followed by the fuel-rich gases.

Carbon has an energy content similar to aluminum. Carbon can be generated as a solid suspension and will not condense on any engine surfaces.

To ensure the optimum condition for fuel-air detonation, the fuel and air must be thoroughly mixed to ensure the fuel concentration is within the detonability limit (i.e., near stoichiometric). The components must be mixed to length scales comparable to the detonation phenomena length scales.

Mixing can be characterized on several levels including macroscopic and microscopic scales. Macroscopic mixing refers to the bulk fluid processes which bring the fuel and air components to close proximity (e.g., impingement of fuel and air streams). Microscopic mixing is the process by which the fuel and air are further mixed to a length scale required for detonation. Many techniques can be employed to produce microscopic mixing. However, care must be taken to minimize total pressure losses associated with these devices.

Several mixing strategies have been developed to ensure the necessary fuel-air conditions exist within the detonation combustors of the present invention. As illustrated in FIG. 11, an air impingement ring 63 may be used to direct the air stream to mix with the fuel. The ring 63 has a tapered surface so that the air introduced at a radially outward position is directed toward the fuel introduced at a radially inward position. It will be appreciated that the air impingement ring 63 also acts to direct air for "topping-off" the fueled combustor tube and for purging the combustor tube of remaining gases after firing.

Figure 22:
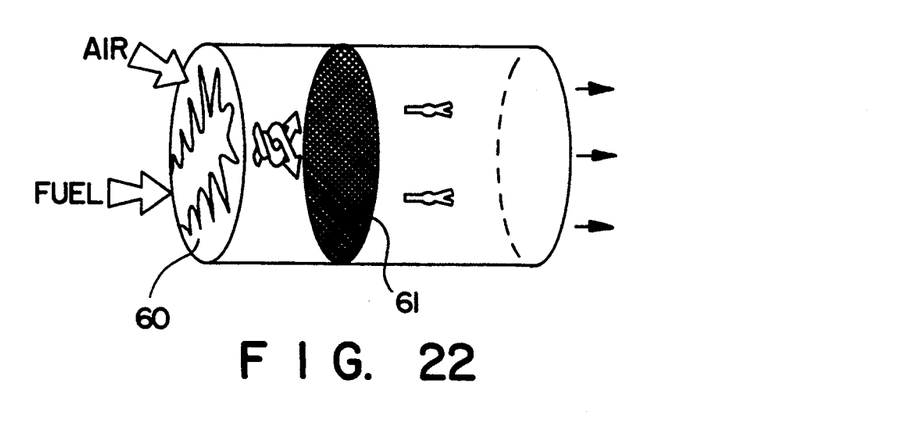
FIG. 22 shows a schematic representation of an embodiment of a mixing arrangement for use in the present invention.
Figure 23A:
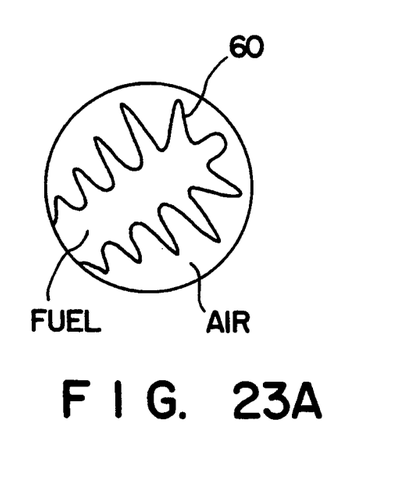
FIG. 23A shows a top view of the inlet vortex generator of the mixing arrangement of FIG. 22.
Figure 23B:
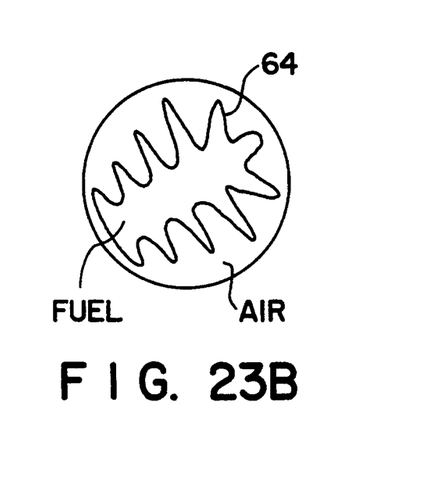
FIG. 23B shows a top view of an alternative embodiment of an inlet vortex generator.

As illustrated schematically in FIG. 22, when solid or gas fuel is used, fuel and air may be injected at the top of a detonative combustor through a serrated vortex generator 60 (macroscopic mixing) followed by a mixing mesh 61, injection ring or mixing module (microscopic mixing). The components of this mixing arrangement may be located in the top zone of each detonation tube 10. A top view of the serrated vortex generator 60 is shown in FIG. 23A. FIG. 23B shows an alternative serrated vortex generator 64 in which the fuel port is displaced on both the leading and trailing edges from the edge of the air port.

Figure 24:
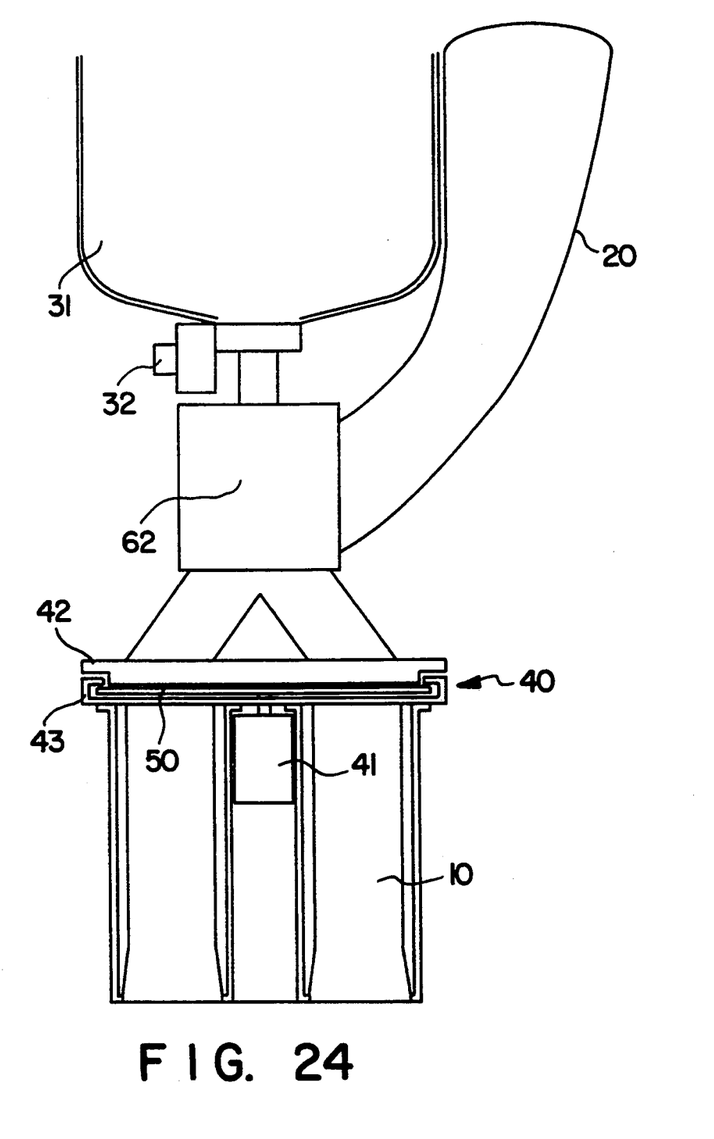
FIG. 24 shows a cross-sectional view of an alternative embodiment of the pulse detonation engine of the present invention, incorporating a pre-mixer.

Another mixing strategy involves mixing the fuel and air in a separate pre-mixer before injection of the fuel and air into the detonative combustors. FIG. 24 illustrates this concept, with the pre-mixer indicated by reference numeral 62. The primary problem related to the pre-mixing concept is the potential of pre-ignition due to inadequate isolation of the mechanical elements of the engine. A variation of this strategy is to partially pre-mix the fuel and air to a fuel concentration level just outside the fuel-air mixture's detonability limits.

Electric power for the rotor plate motor, spark ignition system and other vehicle systems can be derived from several sources including batteries, inlet air or gas generator electric turbo generators, or a combination of these sources. Inlet air or gas generator systems consist of a turbine rotor, placed in either the air or gas generator flow, in order to drive a small electric generator.

Materials should be selected dependent upon anticipated operating conditions. It is expected that the engine material could be exposed to peak temperatures approaching 2500K and peak pressures of the order of 20–40 atmospheres. Pressures just behind the detonation wave's shock front (i.e., in the ignition delay region) are of the order of 40 atmospheres, and pressure ratios across the entire detonation region are of the order of 20 atmospheres. The mode of operation will also expose the structure to periodic variations of both a thermal and mechanical nature.

Components made from carbon/carbon or titanium/zirconium/molybdenum (or similar alloy) may be used in construction of the pulse detonation engine of the present invention. For example, the detonation tubes and the lower mounting plate of the manifold/rotor assembly could be manufactured as one continuous piece of carbon/carbon composite. The rotor disk may also be fabricated using carbon/carbon composites.

Carbon/carbon can be machined to tolerances which produce surface finishes approaching the smoothness of machined metal. Carbon/carbon has a very low thermal expansion coefficient and will allow the components of the engine to be assembled to very close tolerances, thus minimizing potential sealing problems. Carbon/carbon fibrous materials are manufactured by many companies.

Titanium/zirconium/molybdenum offers high temperature capability, is easily machined, and is available from many specialty metal suppliers.

Several methods for initiating a detonation cycle may be used. Detonation may be initiated by igniting a fuel-oxygen mixture in a small detonation tube which discharges into a combustor, or by igniting a fuel-oxygen mixture collocated within the combustor. Alternatively, a high voltage electric discharge or pyrotechnic ignitor can be used. All three approaches may be effective given fuel detonation characteristics, certain energy and power constraints.

The small detonation tube method requires fuel, an oxidizer, pumps, high speed fluid valves, an electronic controller, a power supply and a spark generator. The direct electric discharge method requires a spark plug, electronic controller and a power supply. Pyrotechnic ignition is viable if a small solid rocket is fired systematically into each combustor (e.g., through a small rotor or cylinder valve) to initiate detonation.

The choice of ignition method is dependent on engine size and on the characteristics of the fuel used. In order to keep the design of the propulsion system as simple as possible, the direct electric discharge/predetonator method and pyrotechnic ignitor are preferred.

What is claimed is:

1. A rotary valve multiple combustor pulse detonation engine comprising:
    at least two detonation chambers, each having an inlet end and an outlet end;
    a fuel manifold for supplying fuel from a fuel source to said at least two detonation chambers at said inlet ends;
    an inlet air duct manifold for supplying air to said at least two detonation chambers at said inlet ends;
    means for initiating a pulsed supersonic shock wave-triggered detonation combustion wave for initiating detonation in said at least two detonation chambers; and
    a rotor disk valve having at least one opening and at least one solid portion, wherein said rotor disk valve is positioned between said inlet ends of said detonation chambers and said fuel and inlet air duct manifolds, wherein said rotor disk valve rotates so that said opening is positioned over said inlet end of one of said at least two detonation chambers to allow fuel and air to enter said detonation chamber, and wherein said rotor disk valve further rotates so that said solid portion is positioned over said inlet end of said one of said at least two detonation chambers so that said fuel and air inside said one of said at least two detonation chambers can be detonated by said means for initiating a pulsed supersonic shock wave-triggered detonation combustion wave.

2. The rotary valve multiple combustor pulse detonation engine of claim 1 further comprising:
    a manifold mounting plate connected to said fuel manifold and said inlet air duct manifold; and
    a combustor mounting plate connected to said at least two detonation chambers;
    wherein said rotor disk valve is positioned for rotation between said manifold mounting plate and said combustor mounting plate.

3. The rotary valve multiple combustor pulse detonation engine of claim 1 further comprising a bearing system positioned on a side of said rotor disk valve facing away from said at least two detonation chambers, wherein forces from said detonation chambers on said rotor disk valve are transferred through said bearing system.

4. The rotary valve multiple combustor pulse detonation engine of claim 1 wherein said fuel manifold ends in an individual fuel port for each detonation chamber and said inlet air duct manifold ends in an individual air port for each detonation chamber and wherein said individual fuel port has an extent in one direction less than an extent of said individual air port so that when said opening of said rotor disk valve closes said individual fuel port, said individual air port remains open so that air but not fuel is introduced into said detonation chamber to create an air buffer after said detonation chamber is fueled.

5. The rotary valve multiple combustor pulse detonation engine of claim 1 wherein said fuel manifold ends in an individual fuel port for each detonation chamber and said inlet air duct manifold ends in an individual port for each detonation chamber and wherein said individual fuel port has an extent in one direction less than an extent of said individual air port, so that when said opening of said rotor disk valve opens said inlet end of said detonation chamber, said individual air port is open but said individual fuel port remains closed so that air but not fuel is introduced into said detonation chamber to purge said detonation chamber of any remaining burnt gases.

6. The rotary valve multiple combustor pulse detonation engine of claim 1 wherein said fuel source comprises a solid fueled gas generator.

7. The rotary valve multiple combustor pulse detonation engine of claim 1 wherein said fuel comprises a liquid fuel.

8. The rotary valve multiple combustor pulse detonation engine of claim 1 wherein said fuel comprises a gas fuel.

9. The rotary valve multiple combustor pulse detonation engine of claim 1 further comprising an air impingement ring at said inlet ends of said at least two detonation chambers for mixing said fuel and air.

10. The rotary valve multiple combustor pulse detonation engine of claim 1 further comprising a serrated vortex generator and a mixing mesh for mixing said fuel and air.

11. The rotary valve multiple combustor pulse detonation engine of claim 1 further comprising a pre-mixer for mixing said fuel and air before injection into said detonation chambers.

12. The rotary valve multiple combustor pulse detonation engine of claim 1 wherein said means for initiating a pulsed supersonic shock wave-triggered detonation combustion wave comprises a spark plug.

13. The rotary valve multiple combustor pulse detonation engine of claim 1 further comprising an oxidizer generator and wherein said means for initiating a pulsed supersonic shock wave-triggered detonation combustion wave comprises a separate predetonation tube which is supplied with an oxidizer from said oxidizer generator.

14. The rotary valve multiple combustor pulse detonation engine of claim 1 further comprising an oxidizer generator for supplying an oxidizer to said detonation chambers and wherein said means for initiating a pulsed supersonic shock wave-triggered detonation combustion wave comprises a separate predetonation region within said detonation chambers created by supplying said oxidizer from said oxidizer generator to said detonation chambers.

15. The rotary valve multiple combustor pulse detonation engine of claim 1 further comprising a nozzle shroud connected to said outlet ends of said at least two detonation chambers.

16. A predetonator-initiated pulse detonation engine comprising:
at least one detonation chamber, having an inlet end and an outlet end;
a fuel manifold for supplying fuel from a fuel source directly to said at least one detonation chamber at said inlet end;
an inlet air duct manifold for supplying air directly to said at least one detonation chamber at said inlet end; and
a means for initiating a pulsed supersonic shock wave-triggered detonation combustion wave for initiating detonation in said at least one detonation chamber;
wherein said means for initiating a paused supersonic shock wave-triggered detonation combustion wave comprises a predetonator.

17. The predetonator-initiated pulse detonation engine of claim 16 wherein said predetonator comprises a separate predetonation tube fueled with fuel and an oxidizer and constructed to fire into said at least one detonation chamber to initiate detonation.

18. The predetonator-initiated pulse said at least one detonation engine of claim 17 further comprising an air impingement ring at said inlet end of said detonation chamber for mixing said fuel and air.

19. The predetonator-initiated pulse detonation engine of claim 17 further comprising a serrated vortex generator and a mixing mesh for mixing said fuel and air.

20. The predetonator-initiated pulse detonation engine of claim 17 further comprising a pre-mixer for mixing said fuel and air before injection into said at least one detonation chamber.

21. The predetonator-initiated pulse detonation engine of claim 16 wherein said predetonator comprises a separate predetonation region within said at least one detonation chamber created by injecting fuel and an oxidizer into said detonation chamber.

22. The predetonator-initiated pulse detonation engine of claim 21 further comprising an air impingement ring near said inlet end of said at least one detonation chamber for mixing said fuel and air.

23. The predetonator-initiated pulse detonation engine of claim 21 further comprising a serrated vortex generator and a mixing mesh for mixing said fuel and air.

24. The predetonator-initiated pulse detonation engine of claim 21 further comprising a pre-mixer for mixing said fuel and air before injection into said at least one detonation chamber.

* * * * *